United States Patent
D'Agostino et al.

(10) Patent No.: US 6,901,953 B2
(45) Date of Patent: Jun. 7, 2005

(54) FUEL METERING DEVICE FOR A TURBOMACHINE INJECTOR

(75) Inventors: Guy D'Agostino, Vitry sur Seine (FR); Michel Hugues, Bois le Roi (FR); Marion Michau, Vincennes (FR); Alain Tiepel, Chailly en Biere (FR); José Rodrigues, Nandy (FR)

(73) Assignee: Hispano-Suiza, Colombes (FR)

( * ) Notice: Subject to any disclaimer, the term of this patent is extended or adjusted under 35 U.S.C. 154(b) by 198 days.

(21) Appl. No.: 10/298,562

(22) Filed: Nov. 19, 2002

(65) Prior Publication Data
US 2003/0094203 A1 May 22, 2003

(30) Foreign Application Priority Data
Nov. 20, 2001 (FR) .............................................. 01 14974

(51) Int. Cl.[7] .......................... F16K 15/00; F02C 7/232
(52) U.S. Cl. .............................. 137/512.1; 137/516.27; 60/741; 239/533.2; 239/533.9
(58) Field of Search ........................... 239/539.9, 533.2, 239/533.3, 533.4, 533.5; 137/512.1, 516.27, 628, 630.19; 60/741

(56) References Cited

U.S. PATENT DOCUMENTS

| 2,704,035 A | 3/1955 | Bader |
| 2,921,747 A | * 1/1960 | Burman ........................ 239/464 |
| 3,662,959 A | 5/1972 | Sample, Jr. |
| 4,226,365 A | 10/1980 | Norris et al. |
| 4,570,668 A | 2/1986 | Burke et al. |
| 5,242,117 A | * 9/1993 | D'Agostino et al. ..... 239/533.2 |
| 5,732,730 A | 3/1998 | Shoemaker et al. |

FOREIGN PATENT DOCUMENTS

| EP | 0 518 594 A1 | 6/1992 |
| GB | 2 250 086 | 5/1992 |

* cited by examiner

Primary Examiner—Ramesh Krishnamurthy
(74) Attorney, Agent, or Firm—Oblon, Spivak, McClelland, Maier & Neustadt, P.C.

(57) ABSTRACT

A fluid metering device including a metering valve capable of sliding in a bushing under fluid feed pressure in order to enable a fluid to be admitted and then ejected. The valve can have, at a first end, an opening opening out into a longitudinal fluid admission bore, and at a second end forming an end wall, a valve head provided with fluid metering slots opening out into the longitudinal bore and defining varying flow sections. The valve head can further include at least one substantially transverse orifice disposed downstream from the metering slots in the fluid flow direction, the orifice communicating with the longitudinal bore and defining at least one fixed flow section.

29 Claims, 3 Drawing Sheets

FIG.2
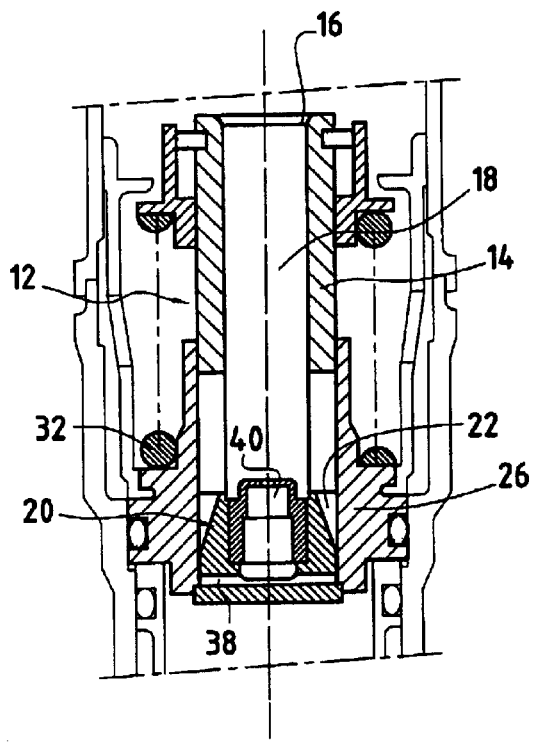
FIG.3
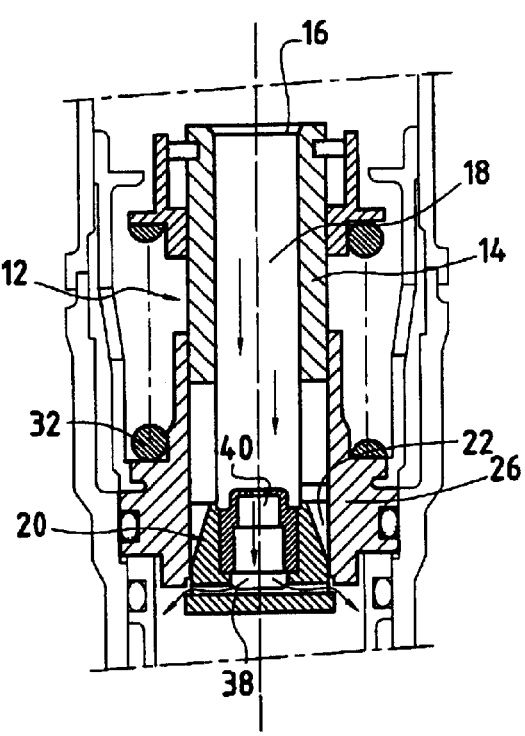
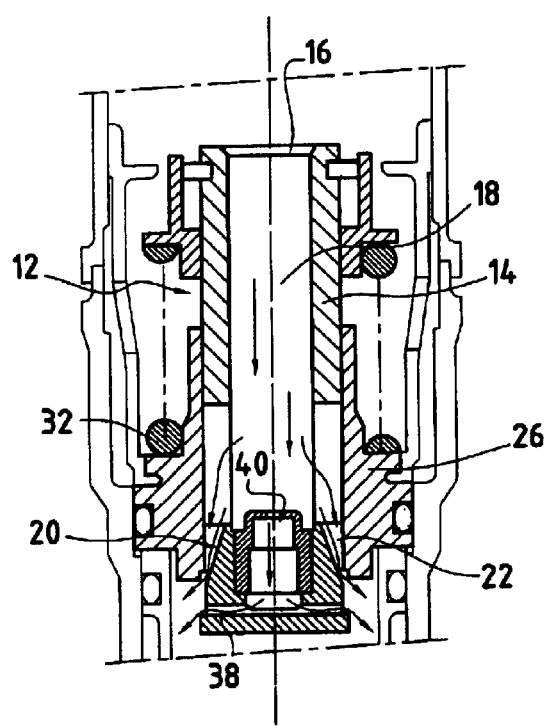
FIG.4

FUEL METERING DEVICE FOR A TURBOMACHINE INJECTOR

BACKGROUND OF THE INVENTION

The present invention relates to the general field of devices for adjusting a fluid flow rate, and more particularly to that of devices for adjusting the feed rate of fuel injectors provided for the combustion chambers of turbomachines.

In conventional manner, a turbomachine engine has a plurality of injectors enabling the combustion chamber to be fed with fuel and air when starting and during normal operation of the turbomachine engine. There exist two main types of injector: "aeromechanical" injectors designed for two fuel flow rates (a primary rate and a secondary rate) depending on the operating stage of the engine (lighting, or from low to full power), and "aerodynamic" injectors which have only one fuel circuit for all stages of operation. The present invention relates more particularly to injectors belonging to the second category.

In conventional manner, a fuel injector for a turbomachine engine comprises in particular a metering valve arranged to open under a predetermined fuel feed pressure and to remain open in response to an increase in said feed pressure so as to enable fuel to be admitted and then ejected towards the nose of the injector where the fuel is sprayed into the combustion chamber. The fuel feed rate is adjusted by means of metering slots provided in a head of the valve and presenting flow sections that vary as a function of the applied feed pressure: the higher the feed pressure, the greater the flow sections of the slots.

In practice, it is found that in a combustion chamber fed with fuel and air by a plurality of injectors of the kind described above, there exist differences in flow rate on opening and/or closing the respective valves even when said injectors are all subjected to the same feed pressure. These flow rate differences between injectors are caused by a hysteresis phenomenon due to friction between the injector valve and the bushing in which it slides. Thus, two identical injectors subjected to the same feed pressure can present different flow sections via their metering slots. This causes the feed of fuel into the combustion chamber to be non-uniform by an amount that can be as great as 45%, and this in turn can lead to difficulties in lighting the turbomachine engine, and can even prevent the engine from lighting.

OBJECT AND SUMMARY OF THE INVENTION

The present invention thus seeks to mitigate such drawbacks by proposing a fluid metering device for a turbomachine injector which makes it possible to eliminate the effects caused by hysteresis by making use of the dead stroke of the head of the valve, i.e. its stroke between the beginning of opening and the moment when the metering slots are reached. The invention also provides a method of metering fluid by implementing such a device.

To this end, there is provided a fluid metering device comprising a metering valve capable of sliding in a bushing under fluid feed pressure in order to enable a fluid to be admitted and then ejected towards means for utilizing said fluid, the valve having, at a first end, an opening opening out into a longitudinal fluid admission bore, and at a second end forming an end wall, a valve head provided with fluid metering slots opening out into the longitudinal bore and defining varying flow sections leading towards said means for utilizing the fluid, wherein said valve head further comprises at least one substantially transverse orifice disposed downstream from the metering slots in the fluid flow direction, said orifice communicating with the longitudinal bore and defining at least one fixed flow section towards said means for utilizing the fluid.

The device thus makes it possible to obtain a fixed flow rate of fluid towards the utilization means, which flow rate depends solely on the flow section of the transverse orifice. This orifice opens out towards the utilization means starting from a predetermined fluid feed pressure which is lower than a pressure at which the metering slots feed the utilization means. As a result, any delay due to the hysteresis phenomenon and leading to non-uniform feed is avoided. Hysteresis therefore no longer has any effect on low flow rates.

Advantageously, the metering device of the invention has a first diaphragm disposed upstream from the transverse orifice in the fluid flow direction. This first diaphragm enables the flow rate of fluid passing through the transverse orifice to be set to a determined value.

The fluid metering device of the invention is particularly suitable for use as a fuel injector metering device for a turbomachine engine. In this application, hysteresis no longer has any effect on low flow rates and better uniformity of fuel feed is obtained in the combustion chamber of the engine, particularly during the difficult stage of lighting the engine.

BRIEF DESCRIPTION OF THE DRAWINGS

Other characteristics and advantages of the present invention appear from the following description given with reference to the accompanying drawings which show an embodiment that has no limiting character. In the figures:

FIGS. 2 to 4 are section views of the FIG. 1 metering device in three different operating modes.

DETAILED DESCRIPTION OF AN EMBODIMENT

Figure 1:
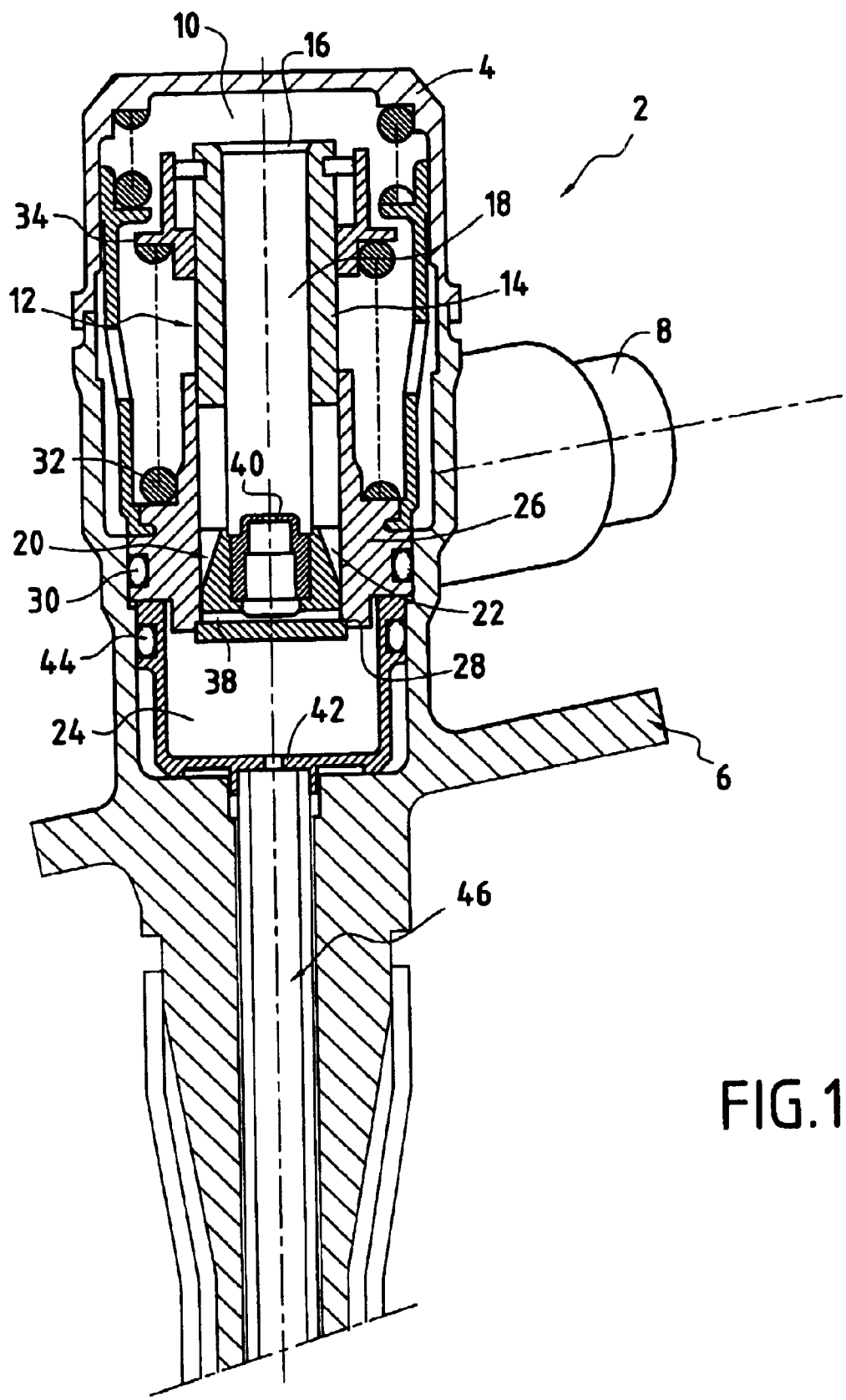
FIG. 1 is a longitudinal section view of a fuel injector for a turbomachine engine, the injector including a metering device of the present invention.

Reference is made initially to FIG. 1 which is a longitudinal section of a fuel injector for a turbomachine engine, the injector including a metering device of the invention.

The fuel injector 2 comprises an injector body 4 having a flange 6 adapted to be fixed to a turbomachine body (not shown). The fuel injector 2 as shown is of the "aerodynamic" type, i.e. it has only a single fuel circuit.

The injector body 4 has a fuel admission orifice 8 for receiving fuel under pressure from a suitable pump (not shown). The fuel penetrates into an admission chamber 10 prior to passing through a metering device 12 of the invention.

The fuel metering device 12 is mounted directly in the fuel admission chamber 10. It comprises a metering valve 14 serving to control the flow of fuel passing through the device. This metering valve is provided at a first end with an opening 16 leading to a longitudinal fuel admission bore 18, and at a second end having an end wall, it has a substantially circular shoulder forming a valve head 20. Around its periphery, this valve head has fuel metering slots 22 opening out into the longitudinal bore 18 and defining varying flow sections leading to means for utilizing the fuel. These slots 22 are shaped very precisely so as to meter the quantity of fuel that flows from the admission chamber 10 towards a fuel reception chamber 24 formed in the injector body 4.

The metering valve 14 is slidable in a cylindrical bushing 26 having one end which includes a circular recess 28 forming a valve seat. This bushing is held in the injector body 4 in leaktight manner by gasket type sealing means 30. The bushing 26 also forms a bearing surface for one end of a helical spring 32 whose opposite end is mounted in an annular retaining element 34 fixed to the end of the valve including the longitudinal fuel admission bore 18. The spring 32 is adjusted in such a manner as to enable the metering valve 14 to open at a predetermined pressure of fuel and to remain open when said feed pressure increases.

In the invention, the metering device 12 is also provided with at least one substantially transverse orifice 38 disposed in the valve head 20 downstream from the metering slot 22 in the fuel flow direction. This transverse orifice opens out into the longitudinal fluid admission bore 18 and communicates with the fuel reception chamber 24. This orifice thus enables a fixed flow section to be defined towards the means for utilizing fuel, and to ensure effectively that the rate of flow to the turbomachine engine while it is being lighted corresponds to fuel flow at a low rate (less than about 30 liters per hour).

Still in the invention, the flow of fuel passing through the transverse orifice 38 can advantageously be set at a first determined rate by placing a first diaphragm 40 on the path of the fuel, between the longitudinal bore and said transverse orifice. The flow of fuel is thus controlled by the opening formed through the first diaphragm 40. This opening is shaped in such a manner as to enable fuel to flow through it at a rate that is considerably smaller than the rate which passes through the transverse orifice 38. As a result, the flow of fuel passing through the first diaphragm 40 and then the transverse orifice 38 is a function solely of the opening formed in the first diaphragm. This characteristic is particularly advantageous at very low fuel flow rates. It is difficult to machine a transverse orifice 38 of very small flow section in the valve head 20. The first diaphragm 40 thus makes it possible to avoid performing such an operation. By way of example, the first diaphragm 40 may be constituted by a pierced bowl mounted firmly in the bottom of the valve head 20.

The fuel injector shown in FIG. 1 has a second diaphragm 42 for large flow rates (greater than abut 100 liters per hour) interposed between the metering valve 14 and the means for utilizing the fuel. More precisely, this second diaphragm 42 which is likewise in the form of a pierced bowl is placed at the bottom of the fuel reception chamber 24. The second diaphragm is fixed in leaktight manner on the injector body 4 by sealing means 44 of the gasket type and it serves to set a determined second flow rate value for the fuel passing therethrough. The opening made through the second diaphragm opens out into a fuel ejection channel 46 directing the fuel towards an injector nose (not shown). Using conventional means, the injector nose serves either to atomize the fuel in mechanical or aerodynamic manner, or else to vaporize it.

The operation of the metering device of the invention is described below, more particularly with reference to FIGS. 2 to 4.

FIG. 2 shows the fuel metering device in its initial, rest position; the metering valve 14 is closed and rests against its seat 28. The fuel which penetrates into the admission chamber 10 and into the longitudinal bore 18 via the opening 16 exerts pressure which is not sufficient to enable the metering valve to open.

FIG. 3 shows the metering device once a predetermined pressure defining a first pressure threshold S1 has been reached. Under such circumstances, the metering valve 14 moves under the effect of the feed pressure and slides in the bushing 26 so as to open the valve head 20. The fuel present in the admission chamber 20 and in the metering valve 14 then penetrates into the reception chamber 24 via the transverse orifice 38 after passing through the first diaphragm 40. By way of example, this stage can correspond to a stage of lighting a turbomachine engine fitted with this metering device. The fuel flow rate is fixed and is a function either of the flow section of the transverse orifice 38, or else of the opening formed through the first diaphragm 40, if said opening is smaller.

In FIG. 4, the metering device is in a half-open position in which the feed pressure is higher than a second pressure threshold S2 which is itself higher than the first pressure threshold S1. This second pressure threshold S2 corresponds to a predetermined feed pressure above which the metering slots 22 of the valve head 20 open out into the reception chamber 24. The spring 32 is compressed under the effect of the feed pressure and the fuel continues to pass through the metering valve 14 via the transverse orifice 38. In addition, the fuel present in the bore 18 of the metering valve also leaves through the metering slots 22. The varying flow sections of these slots serve to adjust the injection flow rate, e.g. during normal operation of the turbomachine engine.

Thus, the operation of the metering device of the invention consists in defining a first flow rate D1 for fuel passing through a substantially transverse orifice of fixed section disposed in the metering valve downstream from the metering slots and allowing a flow to pass towards the utilization means above a predetermined feed pressure defining a first pressure threshold S1 which is lower than the second pressure threshold S2. In addition, fuel is injected towards the means for utilizing this fuel (at the nose of the injector) via a metering valve that is capable of sliding in a bushing under the feed pressure of the fuel, with a second fluid flow rate D2 passing through the fuel metering slots defining varying flow sections that are made through the metering valve, the fluid flowing towards the utilization means as from a predetermined feed pressure defining the second pressure threshold S2. The first flow rate D1 can be less than the second flow rate D2, for example.

Figure 5:
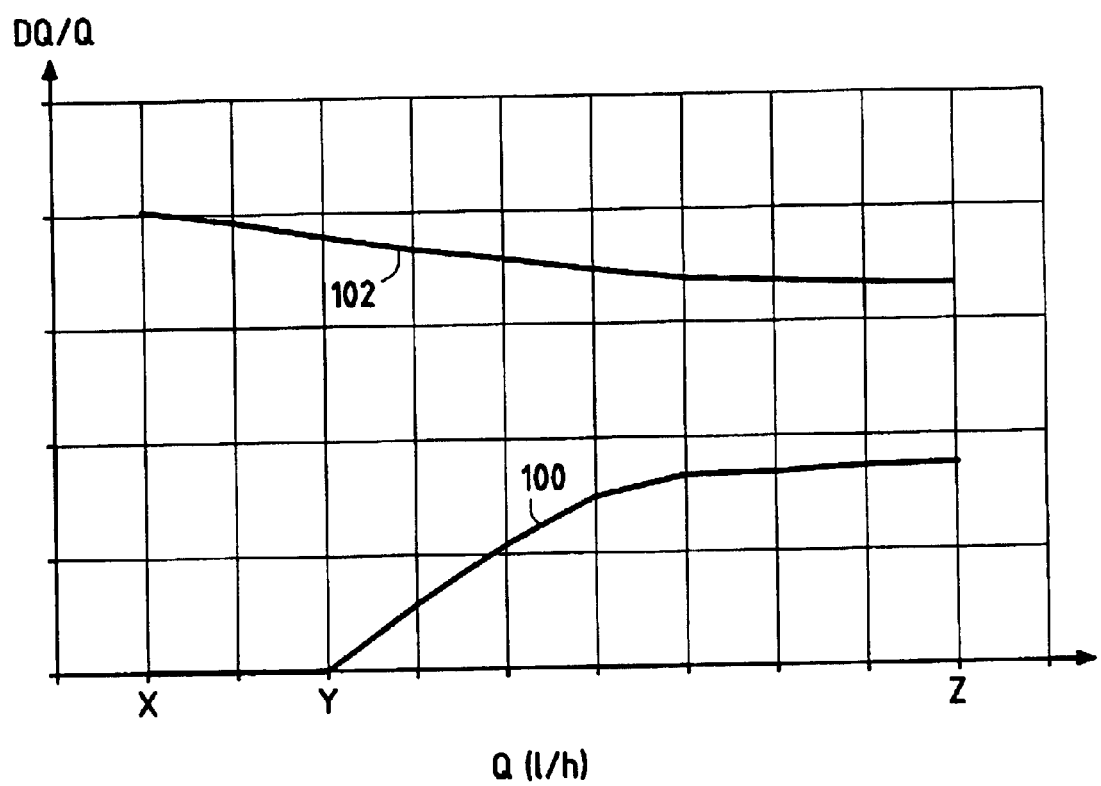
FIG. 5 is a graph showing how hysteresis varies for the injector of FIG. 1 and for a prior art injector.

FIG. 5 shows clearly the effect of the transverse orifice 38 and of the first diaphragm 40 on the metering device. This figure is a graph plotting variation in the hysteresis of a metering device of the invention (curve 100) and of a prior art metering device (curve 102). On curve 100, it can be seen that flow rate is completely uniform between flows of X and Y liters per hour, approximately. At higher flow rates, non-uniformity exists, but nevertheless remains acceptable up to approximately Z liters per hour. Adding the transverse orifice 38 and the first diaphragm 40 thus makes it possible to obtain satisfactory uniformity over the entire lighting range of a turbomachine engine including such a device as a fuel metering device.

The present invention is described above in its application to use in a fuel injector for a turbomachine combustion chamber. Naturally, the device could be applied more generally to any fuel metering device that includes a metering valve capable of sliding in a bushing under a fluid feed pressure in order to enable fluid to be admitted and then ejected towards means for utilizing said fluid, the valve having an opening at a first end that opens out into a longitudinal fluid admission bore and having a valve head end wall at a second end that is provided with fluid metering slots opening out into the longitudinal bore and defining varying flow sections leading to means for utilizing the fluid.

In such a device, and in accordance with the invention, it is appropriate to provide at least one substantially transverse orifice at the valve head which is disposed downstream from the metering slots in the fluid flow direction, said orifice communicating with the longitudinal bore and defining at least one fixed flow section towards the means for utilizing the fluid.

What is claimed is:

1. A fluid metering device comprising a metering valve capable of sliding in a bushing under fluid feed pressure in order to enable a fluid to be admitted and then ejected towards means for utilizing said fluid, the valve having, at a first end, an opening opening out into a longitudinal fluid admission bore, and at a second end forming an end wall, a valve head provided with fluid metering slots opening out into the longitudinal bore and defining varying flow sections leading towards said means for utilizing the fluid, wherein said valve head further comprises at least one substantially transverse orifice disposed downstream from the metering slots in the fluid flow direction, said orifice communicating with the longitudinal bore and defining at least one fixed flow section towards said means for utilizing the fluid.

2. A device according to claim 1, wherein the orifice of the valve head communicates with the longitudinal bore through a first diaphragm serving to fix the flow rate of the fluid passing through said orifice at a determined value.

3. A device according to claim 2, wherein the first diaphragm is a pierced bowl mounted firmly in the end of the valve head.

4. A device according to claim 1, constituting a fuel metering device in a fuel injector for a turbomachine engine.

5. A device according to claim 1, wherein:
said at least one substantially transverse orifice communicates with said means for utilizing the fluid only above a predetermined feed pressure defining a first pressure threshold,
said fluid metering slots communicate with said means for utilizing the fluid only above a predetermined feed pressure defining a second pressure threshold, and
said first pressure threshold is lower than said second pressure threshold.

6. A fuel injector for a turbomachine engine, the injector comprising an injector body having means for admitting fuel under pressure, a metering valve capable of sliding in a bushing under fuel feed pressure in order to meter a fraction of the fuel admitted into the injector body towards means for using said fuel, the valve having, at a first end, an opening opening out into a longitudinal fuel admission bore, and at a second end forming an end wall, a valve head provided with fuel metering slots opening out into the longitudinal bore and defining varying flow sections towards said means for utilizing the fuel, wherein the valve head further comprises at least one substantially transverse orifice disposed downstream from the metering slots in the fuel flow direction, said orifice communicating with the longitudinal bore and defining at least one fixed flow section leading towards said means for utilizing the fuel.

7. A fuel injector according to claim 6, wherein the orifice of the valve head communicates with the longitudinal bore through a first diaphragm enabling the rate at which fuel flows through said orifice to be set to a first determined value.

8. A fuel injector according to claim 7, wherein the first diaphragm is a pierced bowl mounted firmly in the end of the valve head.

9. A fuel injector according to claim 7, further comprising a second diaphragm interposed between the metering valve and the means for utilizing the fuel, and enabling the rate at which fuel passes through said second diaphragm to be set at a second determined valve.

10. A fuel injector according to claim 6, wherein:
said at least one substantially transverse orifice communicates with said means for utilizing the fuel only above a predetermined feed pressure defining a first pressure threshold,
said fuel metering slots communicate with said means for utilizing the fuel only above a predetermined feed pressure defining a second pressure threshold, and
said first pressure threshold is lower than said second pressure threshold.

11. A method of metering fluid comprising injecting a fluid towards utilization means for said fluid through a metering valve capable of sliding in a bushing under a fluid feed pressure, a second fluid flow passing through fluid metering slots defining varying flow sections formed through said metering valve and flowing towards said utilization means from a predetermined feed pressure defining a second pressure threshold, wherein a first flow of fuel is defined through a substantially transverse fixed orifice disposed through the metering valve downstream from said metering slots and leading towards said utilization means as from a predetermined feed pressure defining a first pressure threshold lower than said second pressure threshold.

12. A method according to claim 11, wherein a first diaphragm sets the rate at which fluid flows through the transverse orifice at a determined value.

13. A fluid metering device comprising:
a fluid admission chamber;
a valve provided with a fluid admission bore in communication with said fluid admission chamber, and a valve head defining slots in communication with said fluid admission bore and a substantially transverse orifice downstream from said slots and in communication with said fluid admission bore;
a bushing; and
a fluid ejection channel,
wherein said valve head is configured to move within said bushing under fluid feed pressure from a closed position to a first open position, and from said first open position to a second open position, and wherein
in said closed position, said slots and said substantially transverse orifice do not communicate with said fluid ejection channel,
in said first open position, said substantially transverse orifice communicates with said fluid ejection channel and said slots do not communicate with said fluid ejection channel, and
in said second open position, said slots and said substantially transverse orifice communicate with said fluid ejection channel.

14. A device according to claim 13, wherein said slots are shaped to meter a quantity of fluid that flows from said fluid admission chamber toward said fluid ejection chamber in said second open position.

15. A device according to claim 13, wherein said slots comprise varying flow sections.

16. A device according to claim 13, wherein said slots are located around a periphery of said valve head.

17. A device according to claim 13, wherein said substantially transverse orifice comprises a fixed flow section.

18. A device according to claim 13, wherein said substantially transverse orifice is configured to provide a fixed flow rate through said substantially transverse orifice in said first open position.

19. A device according to claim 13, further comprising a first diaphragm between said substantially transverse orifice and said fluid admission bore.

20. A device according to claim 19, wherein said diaphragm is configured to fix a flow rate of fluid passing through said substantially transverse orifice.

21. A device according to claim 19, wherein the first diaphragm is a pierced bowl mounted on the valve head.

22. A device according to claim 13, wherein said valve head moves from said closed position to said first open position at a predetermined fluid feed pressure defining a first pressure threshold.

23. A device according to claim 22, wherein said valve head moves from said first open position to said second open position at predetermined fluid feed pressure defining a second pressure threshold.

24. A device according to claim 23, wherein said first pressure threshold is lower than said second pressure threshold.

25. A device according to claim 13, further comprising a fluid reception chamber between said valve and said fluid ejection channel.

26. A device according to claim 25, further comprising a second diaphragm between said fluid reception chamber and said fluid ejection channel.

27. A device according to claim 13, further comprising a fluid in said fluid admission chamber and valve.

28. A device according to claim 27, wherein said fluid is a fuel.

29. A device according to claim 13, wherein said fluid admission chamber is part of a fuel injector for an engine.

* * * * *